United States Patent
Miyamoto

(12) United States Patent
(10) Patent No.: US 7,123,597 B1
(45) Date of Patent: Oct. 17, 2006

(54) TRANSMIT POWER CONTROL METHOD IN CDMA MOBILE COMMUNICATION SYSTEM

(75) Inventor: Yukie Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 972 days.

(21) Appl. No.: 09/680,278

(22) Filed: Oct. 6, 2000

(30) Foreign Application Priority Data

Oct. 7, 1999 (JP) .................................. 11-286655

(51) Int. Cl.
*H04Q 7/00* (2006.01)
*H04B 7/216* (2006.01)

(52) U.S. Cl. .................................... 370/331; 370/335
(58) Field of Classification Search ................ 370/311, 370/335, 342, 441, 331, 332, 333; 455/69, 455/442, 522, 524
See application file for complete search history.

(56) References Cited

U.S. PATENT DOCUMENTS 5,574,983 A * 11/1996 Douzono et al. ............. 455/69
6,144,861 A * 11/2000 Sundelin et al. ............ 455/522
6,515,975 B1 * 2/2003 Chheda et al. .............. 370/332

FOREIGN PATENT DOCUMENTS

| EP | 0 645 940 A1 | 9/1994 |
| EP | 0 822 672 A2 | 7/1997 |
| EP | 1 047 207 A2 | 4/2000 |
| JP | 7-107033 | 4/1995 |
| JP | 7-298334 | 11/1995 |
| JP | 08-116306 | 5/1996 |

OTHER PUBLICATIONS

European Search Report dated Nov. 21, 2002.
Japanese Office Action dated Nov. 26, 2002, with partial English translation.
Kojiro Hamabe, "Outer Loop Algorithm of Transmission Power Control in DCMA Cellular Systems", IEICE General Meeting Report (B-5-145), 1999, p. 496.

* cited by examiner

Primary Examiner—Huy D. Vu
Assistant Examiner—Daniel J. Ryman
(74) Attorney, Agent, or Firm—McGinn IP Law Group, PLLC

(57) ABSTRACT

A transmit power control method in a Code Division Multiple Access (CDMA) mobile communication system includes checking whether more than one base transceiver station (BTS) is connected. When two or more BTSs are connected, CH receive SIRs (Signal to Interference Ratios) corresponding to the connected BTSs are selected for a calculation. A reference value Sref is changed according to the calculation. When only one BTS is connected, the reference value Sref is set to an upper limit. The changed reference value Sref is reported to all the connected BTSs. The reference value Sref is decided in response to the variation in selection/synthesis gain due to an increase or decrease of the number of connected BTSs.

23 Claims, 9 Drawing Sheets

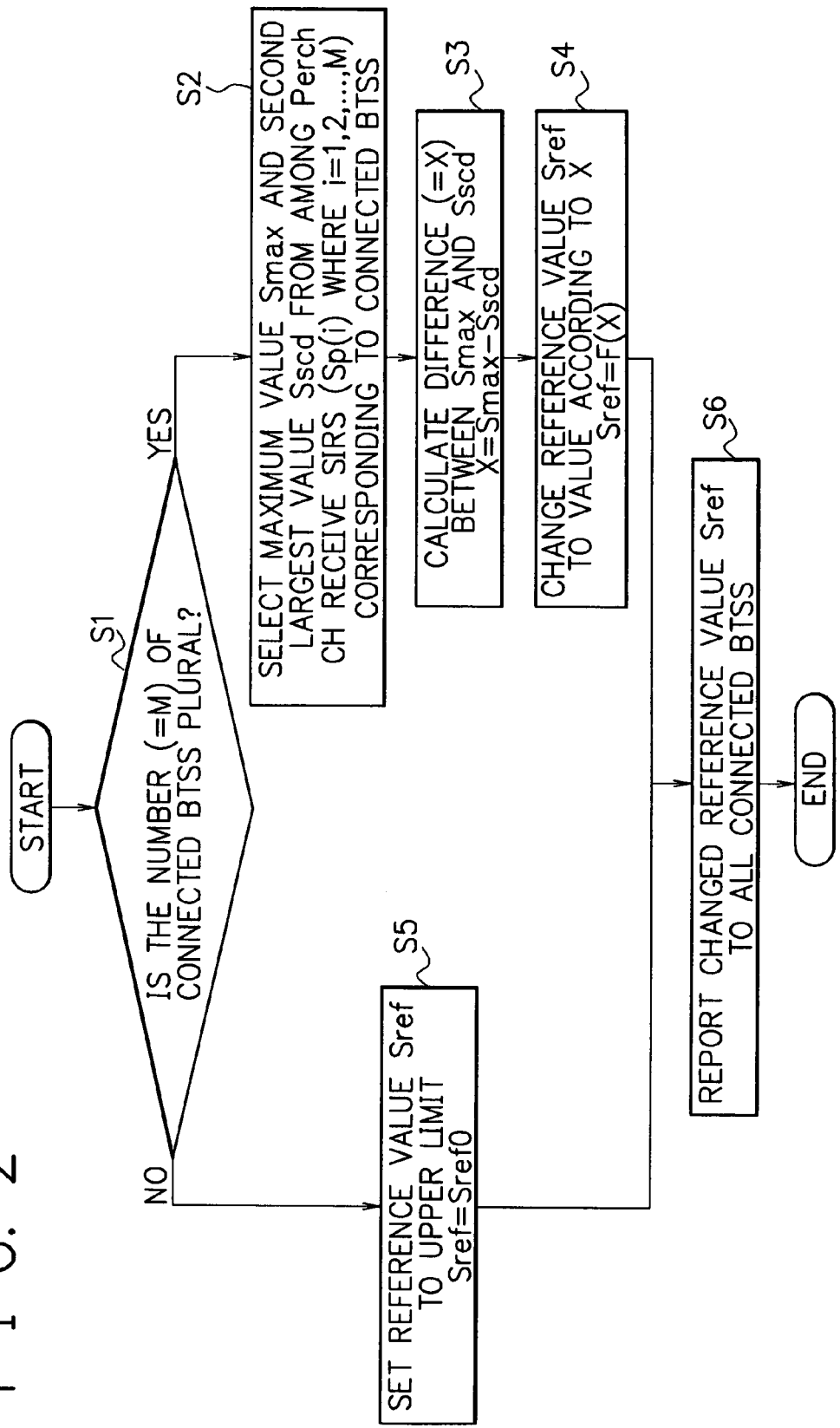
F I G. 2

TRANSMIT POWER CONTROL METHOD IN CDMA MOBILE COMMUNICATION SYSTEM

BACKGROUND OF THE INVENTION

The present invention relates to a transmit power control method in a CDMA mobile communication system.

DESCRIPTION OF THE RELATED ART

Conventionally, in a transmit power control method in a CDMA mobile communication system, an outer loop control is made depending upon, for example, a reference SIR. In an up link, the outer loop control is made to update the reference SIR (Signal to Interference Ratio) to which a BTS (Base Transceiver Station) refers in a high-speed closed loop control.

A description will now be given of the high-speed closed loop control in the up link. In the high-speed closed loop control in the up link, the control is made to periodically change transmit power of an MS (Mobile Station) such that a receive SIR of an up call signal can approach the reference SIR. For example, when the receive SIR measured in the BTS is smaller than the reference SIR, the control is made to set a TPC (Transmit Power Control) bit in a down signal to an instruction pattern to increase MS transmit power, and report the instruction pattern to the MS. On the other hand, when the receive SIR is larger than the reference SIR, the control is made to set a TPC bit in the down signal to an instruction pattern to decrease the MS transmit power, and report the instruction pattern to the MS. If the MS is simultaneously connected to a plurality of BTSs, the MS receives TPC bit patterns independently set by the BTSs. When the MS receives different types of TPC bit patterns from the BTSs, that is, when one BTS requests an increase of transmit power and the other BTS requests a decrease of transmit power, the control is made to increase the MS transmit power as long as all the BTSs connected to the MS request the increase of transmit power, or decrease the MS transmit power otherwise.

It is necessary to set the reference SIR to a minimum value required to achieve a desired level of speech communication quality. However, an optimal value of the reference SIR varies depending upon a propagation environment. Further, when the MS is connected to the plurality of BTSs, an RNC (Radio Network Controller) performs selection/synthesis processing of an up receive signal from each of the BTSs. An optimal value of the reference SIR varies depending upon a variation in gain obtained by the selection/synthesis. When the reference SIR is set to a larger value than is necessary, excessive communication quality causes excessive MS transmit power, resulting in an increased interference with other users. Alternatively, when the reference SIR is too small, it is impossible to achieve the desired level of communication quality after the selection/synthesis in the RNC. Hence, another control has been studied of adaptively changing the reference SIR so as to maintain a constant level of communication quality.

An illustrative study of the prior art reference SIR control method is disclosed in "Outer Loop Algorithm of Transmit Power Control in CDMA Cellular System" IEICE General Meeting Report B-5-145, The Institute of Electronics, Information and Communication Engineers (1999). A periodical control method and an immediate control method are shown as the control algorithm. In the former method, a control is made to vary the reference SIR depending upon a result of measurement of a frame error rate (FER). The control includes the steps of finding the FER at intervals of the predetermined number of frames, and comparing the FER with a desired FER to increase the reference SIR if the measured FER is larger than the desired FER, or decrease the reference SIR if the measured FER is smaller. On the other hand, in the latter method, a control is made to vary the reference SIR depending upon the presence or absence of error in each of the frames. The control includes the steps of detecting the presence or absence of error for each of the receive frames, and increasing the reference SIR by a predetermined value Sinc if the error is found in any one of the frames, or decreasing the reference SIR by a predetermined value Sdec if no error is found. The predetermined value Sinc and the predetermined value Sdec are set such that the following expression can be written by using the desired FER (hereinafter referred to as FERtg):

$$Sdec = Sinc \times FERtg/(1-FERtg)$$

In the periodical control method, a long period is required to measure many frames in calculation of the FER, resulting in a problem in that the reference SIR can be changed at a lower speed. In the immediate control method, however, since the reference SIR is changed for each of the frames, it is possible to change the reference SIR at a higher speed than that in the periodical control method.

However, in the second prior-art, i.e., the immediate control method, the step of decreasing the reference SIR is extremely smaller than the step of increasing the reference SIR. Hence, when the reference SIR should be decreased, a very long period is required to decrease the reference SIR to the optimal value. Thus, the delayed decrease of the reference SIR causes the MS to transmit excessive transmit power for the delayed time interval, resulting in a problem of increased power interfering with other users. Consequently, there is another problem in that an additional control should be made of changing the reference SIR as fast as possible according to the circumstances so as to avoid quality degradation due to a delayed control of increasing the reference SIR, and excessive MS transmit power due to a delayed control of decreasing the reference SIR.

SUMMARY OF THE INVENTION

In view of the foregoing problems, it is an object of the present invention to provide a transmit power control method in a CDMA mobile communication system, of changing at a high speed a reference SIR used for reference in a high-speed closed loop control of an up link.

According to the present invention, for achieving the above-mentioned objects, there is provided a transmit power control method in a CDMA mobile communication system including the checking step of checking whether one or more base transceiver stations (BTSs) are connected, the calculating step of, when a result of the checking step shows that two or more BTSs are connected, selecting CH receive SIRs (Signal to Interference Ratios) corresponding to the connected BTSs, and making a calculation by using the selected values, the reference value changing step of changing a value of a reference value Sref according to a result of calculation, the upper limit setting step of, when the result of the checking step shows that only one BTS is connected, setting the reference value Sref to an upper limit, and the reporting step of reporting the changed reference value Sref to all the connected BTSs in each of the steps. In the method, it is possible to decide the reference value Sref in response to a variation in selection/synthesis gain due to an increase or a decrease of the number of connected BTSs.

Preferably, the CH receive SIR is any one of a Perch CH receive SIR and a communication CH receive SIR for each of the connected BTSs.

Preferably, the calculation made by using the selected value in the calculating step includes any one of the step of selecting the maximum value Smax and the second largest value Sscd from among the CH receive SIRs corresponding to the connected BTSs and the step of selecting the maximum value Smax from among the CH receive SIRs corresponding to the connected BTSs, and any one of the step of calculating a difference (X) between the Smax and the Sscd and the step of calculating the number (Nbts) of BTSs in which a difference between the Smax and the receive SIR becomes a predetermined value T2 or less.

Preferably, the reference value changing step is any one of the step of changing the reference value Sref to a value according to the difference (X) and the step of changing the reference value Sref to a value according to the number (Nbts).

Preferably, when the X is equal to a predetermined threshold value T1 or more, it is decided that only a small gain can be obtained by selection/synthesis, thereby setting the reference value Sref to an upper limit irrespective of results of the steps.

Preferably, when the X is equal to a predetermined threshold value T1 or less, it is decided that a sufficient gain can be obtained by selection/synthesis, thereby setting the reference value Sref to a value according to the X.

Preferably, the reference value Sref is found by the following expression:

$$Sref = Sref0 - (T1-X) \times \alpha$$

where $\alpha$ is a desired constant,
T1 is a predetermined threshold value, and
Sref0 is an upper limit.

BRIEF DESCRIPTION OF THE DRAWINGS

The objects and features of the present invention will become more apparent from the consideration of the following detailed description taken in conjunction with the accompanying drawings in which:

FIG. 2 is a flow chart showing an operation in a first embodiment;

DESCRIPTION OF THE PREFERRED EMBODIMENTS

A detailed description will now be given of preferred embodiments of a transmit power control method in a CDMA mobile communication system according to the present invention referring to the accompanying drawings. FIGS. 1 to 10 show one embodiment of the transmit power control method in the CDMA mobile communication system of the present invention.

Embodiment 1

Figure 1:
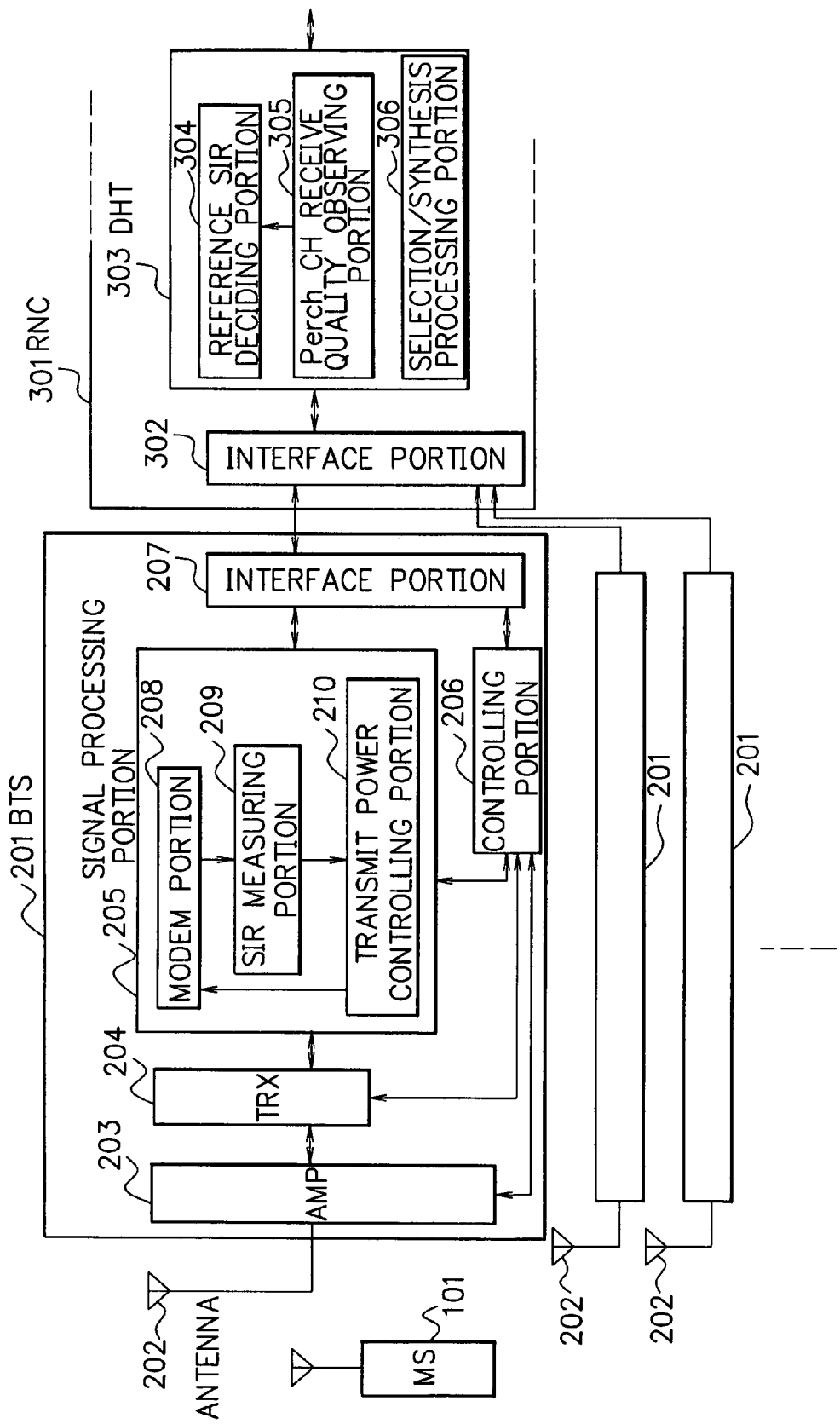
FIG. 1 is a block diagram of a CDMA mobile communication system to which an embodiment of a transmit power control method in a CDMA mobile communication system according to the present invention is applied.

Referring to FIG. 1, the first embodiment is applied to the CDMA mobile communication system including a mobile station (hereinafter abbreviated as MS) 101, a base transceiver station (hereinafter abbreviated as BTS) 201, and a radio network controller (hereinafter abbreviated as RNC) 301. The BTS 201 includes a signal processing portion 205 having a modulator/demodulator portion (modem) 208, an SIR measuring portion 209, a transmit power controlling portion 210, an interface portion 207, a controlling portion 206, a TRX 204, an AMP 203, and an antenna 202. The RNC 301 includes a diversity handover trunk (DHT) 303 having a reference SIR deciding portion 304, a Perch CH receive quality observing portion 305, and a selection/synthesis processing portion 306, and an interface portion 302.

The interface portions 207 and 302 have an interface function between the plurality of BTSs 201 and the RNC 301. The controlling portion 206 has a call processing function and the function of controlling a state of the BTS 201. The MODEM portion 208 performs base band processing such as data error-correcting coding, data demodulation, diffusion modulation with respect to transmit data, and synchronous processing, back-diffusion, and data demodulation with respect to receive data.

The SIR measuring portion 209 measures a signal to interference ratio (hereinafter abbreviated as SIR) of a receive signal. The transmit power controlling portion 210 decides a TPC bit pattern depending upon a reference SIR reported from the reference SIR deciding portion 304 of the RNC 301 and a receive SIR reported from the SIR measuring portion 209.

The MODEM portion 208 adds to a down transmit signal a TPC bit reported from the transmit power controlling portion 210. The TRX (frequency converter) 204 converts frequency. The AMP (amplifier) 202 has the function of amplifying power. The Perch CH receive quality observing portion 305 of the DHT (Diversity Handover Trunk) 303 observes a Perch CH receive SIR of an inform channel reported by the MS 101 to calculate a receive SIR for each of the connected BTSs.

The reference SIR deciding portion 304 decides a reference SIR for the MS 101 on the basis of Perch CH receive SIR information for each of the connected BTSs reported by the Perch CH receive quality observing portion 305, and reports the result to the transmit power controlling portion 210 of the BTS 201. The selection/synthesis processing portion 306 performs selection/synthesis processing of an up receive frame if the MS 101 is in communication with the plurality of BTSs 201.

Referring now to FIGS. 1 and 2, a detailed description will be given of an illustrative whole operation in a method of transmitting transmit power in the first embodiment of the present invention.

The MS 101 measures the Perch CH receive SIR transmitted from the peripheral BTS 201, and uses an up signal to periodically inform the RNC 301 of the measured receive SIR through the BTS 201. A Perch CH is an inform channel transmitted from each of the BTSs at all times. If the BTS 201 is constituted by a plurality of sectors, the Perch CH is transmitted from each of the sectors. The Perch CH receive quality observing portion 305 of the RNC 301 observes the Perch CH receive SIR information of an in-communication sector reported from the MS 101. When the MS is in communication with the plurality of sectors in one BTS, the Perch CH receive quality observing portion 305 calculates the perch CH receive SIR information for each BTS by summing the Perch CH receive SIRs of the sectors.

The Perch CH receive quality observing portion 305 measures Perch CH receive SIR information for each of the connected BTSs 201 to report the information to the reference SIR deciding portion 304. The reference SIR deciding portion 304 compares the sizes of the reported Perch CH receive the SIRs to select the maximum SIR and the second largest SIR. The reference SIR deciding portion 304 decides a value of the reference SIR according to a difference between the maximum SIR and the second largest SIR. If the difference between the SIRs is more than a threshold value, the reference SIR is set to an upper limit. If the difference between the SIRs is equal to the threshold value or less, the reference SIR is more decreased as the difference between the SIRs is smaller. When only one BTS is connected, the reference SIR is set to the upper limit. The reference SIR deciding portion 304 reports the changed reference SIR to the transmit power controlling portion 210 of the BTS 201.

The transmit power controlling portion 210 decides the TPC bit pattern to be contained in a down signal based on the result of comparison between an up communication channel receive SIR of the MS 101, measured in the SIR measuring portion 209 and the reference SIR reported from the RNC 301.

A description will now be given of a reference SIR deciding algorithm in the reference SIR deciding portion 304 with reference to the flow chart shown in FIG. 2. In the flow chart, i denotes the BTS connected to the MS 101, and M is the number of BTSs. If M is two or more (Step S1), the maximum value Smax and the second largest value Sscd are selected from among Perch CH receive SIRs (hereinafter referred to as Sp(i) where i=1, 2, ..., M) corresponding to the connected BTSs (Step S2).

A gain of selection/synthesis obtained in the selection/synthesis processing portion 306 can be estimated by finding a difference X between the maximum value Smax and the second largest value Sscd among the Perch CH receive SIRs (Step S3). The selection/synthesis means an operation in which, when the MS 101 is in communication with the plurality of BTSs, a frame having good quality is selected from among the receive frames in an up signal transmitted from each of the BTSs 201 to the RNC 301.

Figure 3:
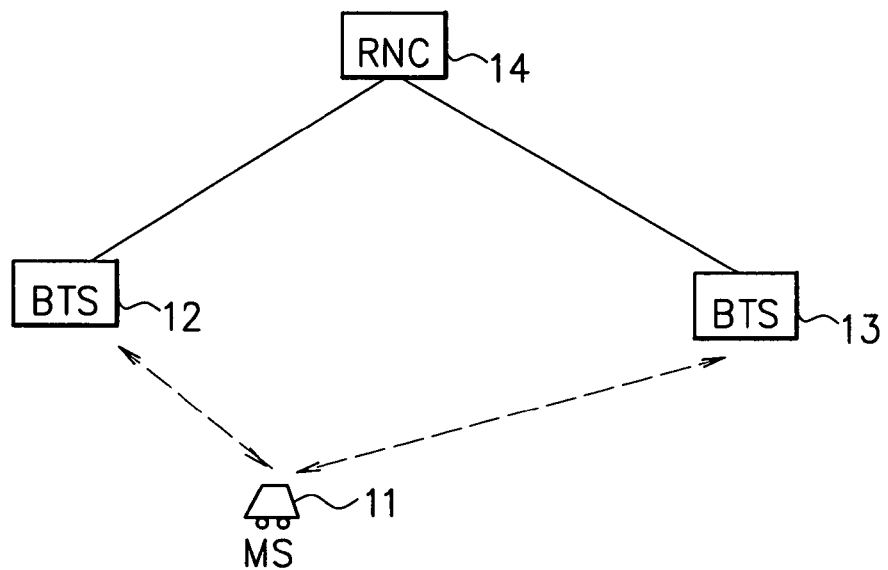
FIG. 3 is a conceptual diagram 1 showing a connection state of an MS in communication with a plurality of BTSs.

A description will now be given of the selection/synthesis when an MS 11 is connected to two BTSs, i.e., a BTS 13 and a BTS 12 shown by FIGS. 3 and 4. As shown in FIG. 3, the MS 11 may be positioned relatively near the BTS 12 with good radio propagation characteristic between the MS 11 and the BTS 12, and poor radio propagation characteristic between the MS 11 and the BTS 13. In this case, an RNC 14 receives from the BTS 12 an up receive frame including fewer errors, and receives from the BTS 13 an up receive frame including greater errors. Thus, there is a high probability that the selection/synthesis processing portion 306 selects the receive frame from the BTS 12 from among the receive frames transmitted from the BTS 12 and the BTS 13.

Figure 4:
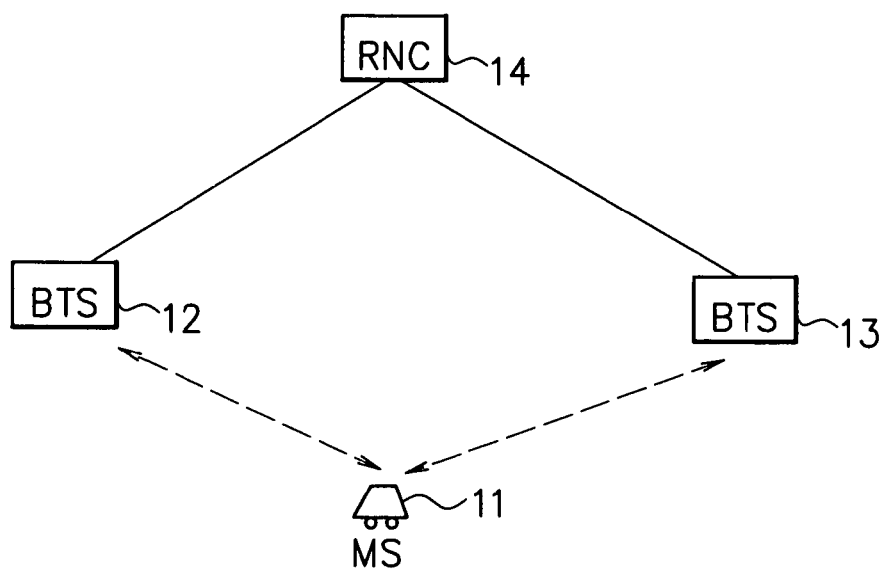
FIG. 4 is a conceptual diagram 2 showing a connection state of the MS in communication with the plurality of BTSs.

On the other hand, as shown in FIG. 4, the MS 11 may stay at a substantially intermediate position between the BTS 13 and the BTS 12 with the same error ratio in the receive frame. In this case, the selection/synthesis processing portion 306 can select each of the receive frames from the BTS 12 and the BTS 13 with the substantially same probability. As illustratively shown in FIG. 4, as a difference in propagation state between the connected BTSs is smaller, the gain of selection/synthesis becomes larger. With a larger gain obtained by the selection/synthesis, it is possible to reduce by the gain the reference SIR set for each of the connected BTSs. Hence, the reference SIR (hereinafter referred to as Sref) is defined as a function of X as shown in the formula (1) (Step S4):

$$Sref = F(X) \qquad (1)$$

Figure 5:
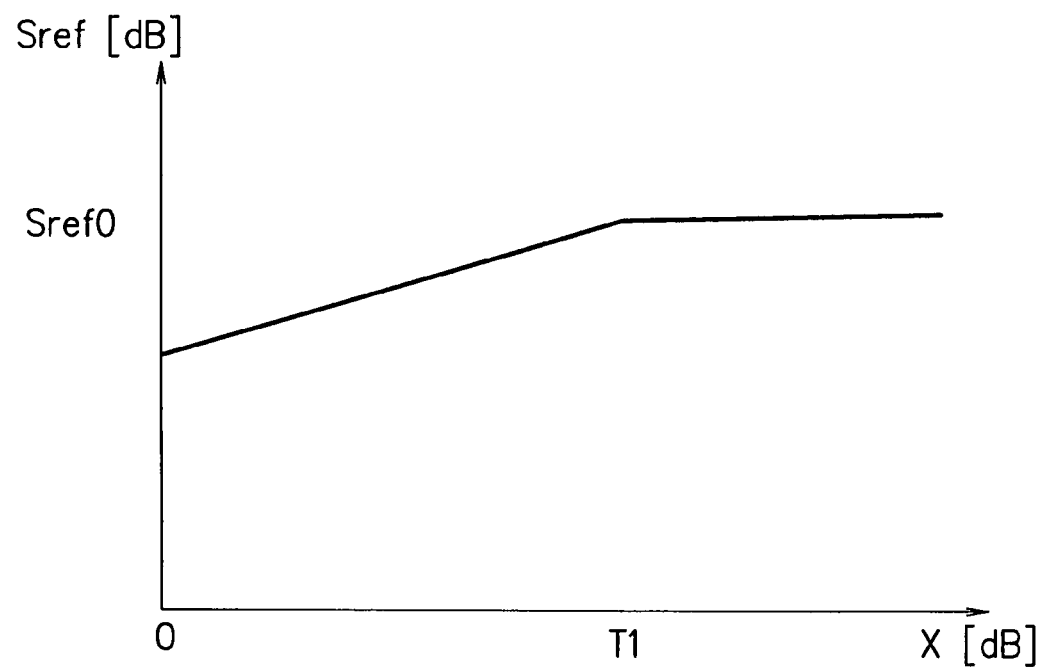
FIG. 5 is a diagram showing a reference SIR in the first and third embodiments.

FIG. 5 shows an illustrative function F(X). If X is more than a threshold value T1, it is decided that a small gain can be obtained by the selection/synthesis. Thus, the following expression is used:

$$Sref = Sref0 \qquad (2)$$

where Sref0 is a reference SIR on the assumption that no selection/synthesis is performed, and serves as an upper limit of Sref. If X is equal to the threshold value T1 or less, it is decided that a sufficient gain can be obtained by the selection/synthesis. Then, Sref is defined as a value according to X as shown in the following expression:

$$Sref = Sref0 - (T1 - X) \times \alpha \qquad (3)$$

Where $\alpha$ is a desired constant.

As X is smaller, Sref is set to a larger value. Further, when no selection/synthesis is performed because one BTS is connected (M=1), Sref is set to an upper limit depending upon the expression (2) (Step S5).

After Sref is changed according to the above steps, the reference SIR deciding portion 304 reports Sref to each of the connected BTSs 201 (Step S6). Since it is decided by using the Perch CH receive SIR information whether or not the reference SIR should be changed, it is possible to respond to a variation in selection/synthesis gain due to an increase or decrease of the number of connected BTSs at a higher speed than that in the prior art control method (a periodical control method, or an immediate control method).

It is the first effect to prevent degradation of speech communication quality by increasing the reference SIR at a high speed when the selection/synthesis gain in the RNC is decreased. This is because it is possible to detect a decrease of the selection/synthesis gain at a high speed by observing the Perch CH receive SIR reported from the MS at regular intervals.

It is the second effect to, when the selection/synthesis gain in the RNC is increased, reduce power interfering with other users by decreasing the reference SIR at a high speed. This is because it is possible to detect an increase of the selection/synthesis gain at a high speed by observing the Perch CH receive SIR reported from the MS at regular intervals.

It is the third effect that it is possible to use the optimal value of the reference SIR in consideration of the selection/synthesis gain even when, after the MS is switched to discrete communication CHs, the MS is connected to the plurality of BTSs to perform the selection/synthesis. This is because it is possible to measure the Perch CH receive SIRs transmitted from the sectors at all times before the MS is switched to the communication CHs, and previously decide the reference SIR depending upon the measured receive SIR.

Embodiment 2

Figure 6:
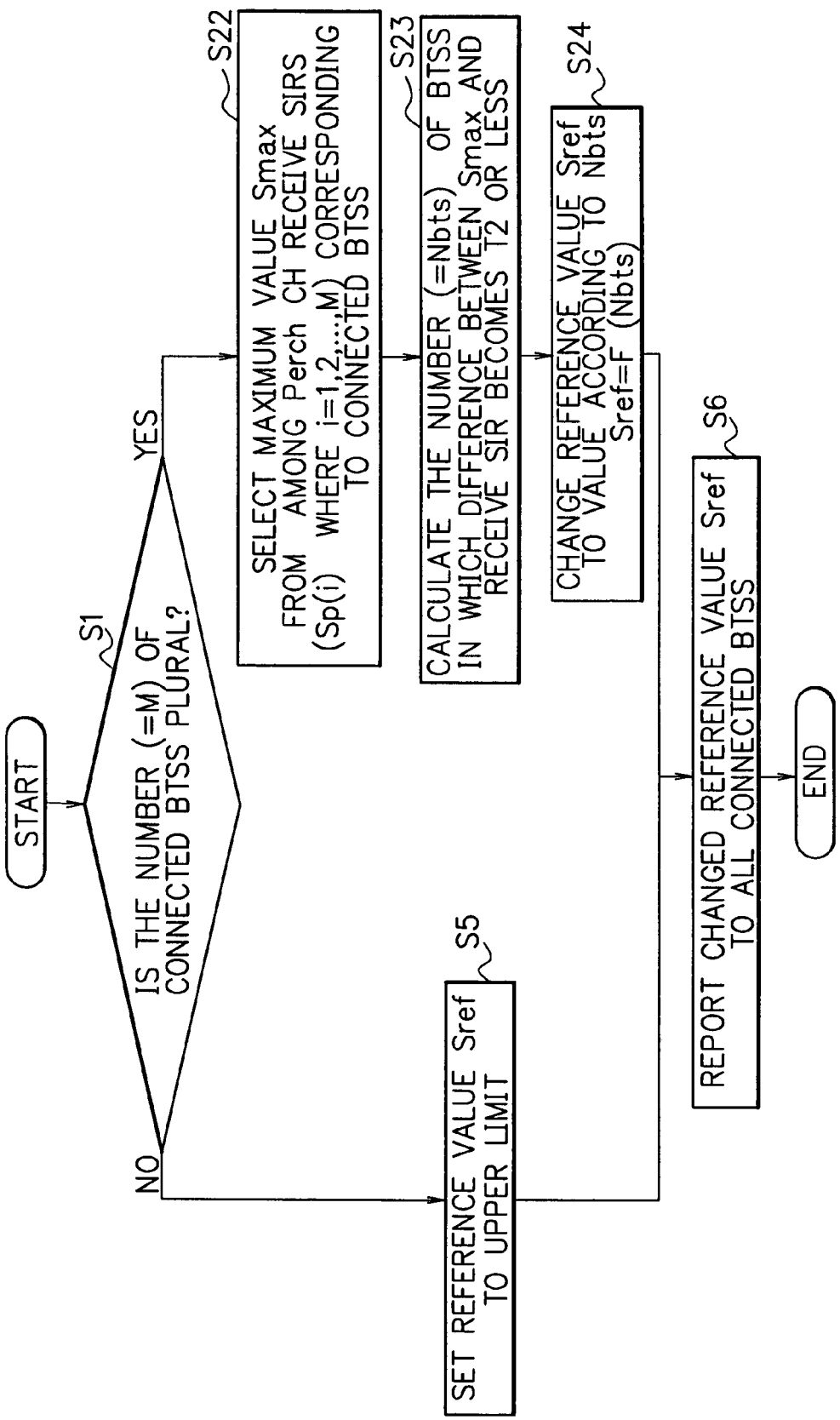
FIG. 6 is a flow chart showing an operation in a second embodiment.

A description will now be given of embodiment 2 of the present invention referring to FIGS. 1 and 6. Referring to the block diagram of FIG. 1, the embodiment 2 is identical with the embodiment 1 except that a reference SIR deciding portion 304 selects the maximum value from among Perch CH receive SIRs corresponding to connected BTSs, reported from a Perch CH receive quality observing portion 305, and calculates the number of connected BTSs (hereinafter referred to as Nbts) in which a difference between the maximum value and the receive SIR becomes equal to a threshold value or less, thereby deciding depending upon Nbts whether or not the reference SIR should be changed. If Nbts is two or more, a current reference SIR is changed according to Nbts. If Nbts is one or only one BTS is connected, the reference SIR is set to an upper limit Sref0. The reference SIR deciding portion 304 reports the changed reference SIR to a transmit power controlling portion 210 of a BTS 201.

Referring now to the flow chart of FIG. 6, a description will be given of a reference SIR deciding algorithm employed in the reference SIR deciding portion 304. In the flow chart, i denotes the BTS connected to an MS 101, and M is the number of BTSs. If M is two or more (Step S1), the maximum value Smax is selected from among Perch CH receive SIRs (hereinafter referred to as Sp(i) where i=1, 2, . . . , M) corresponding to the connected BTSs (Step S22). Subsequently, a difference between Smax and Sp(i) except Smax is compared with a predetermined threshold value T2 according to the following formula (4) to calculate the number Nbts of connected BTSs (Step S23):

$$Smax - Sp(i)T2 \quad (4)$$

The Nbts obtained by the calculation using above formula (4) means the number of BTSs having similar propagation path characteristic among the connected BTSs. As Nbts is larger, a gain of selection/synthesis becomes greater. Therefore, it is possible to decrease the reference SIR set for each of the connected BTSs. Then, the reference SIR is defined as a function of Nbts as follows:

$$Sref = F(Nbts) \quad (5)$$

Figure 7:
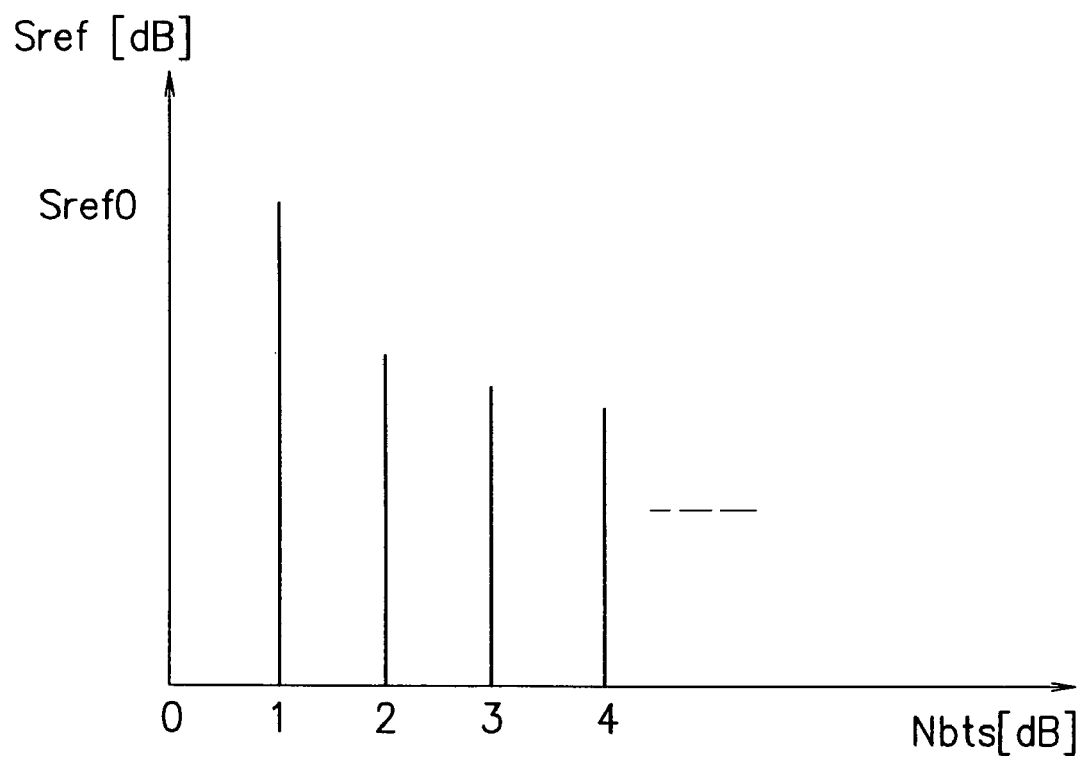
FIG. 7 is a diagram showing a reference SIR in the second and fourth embodiments.

FIG. 7 shows an illustrative relationship between Nbts and Sref shown by the function F(Nbts) according to the formula (5). For Nbts=0, Sref becomes an upper limit Sref0. As Nbts is more increased, the gain of the selection/synthesis is more increased. Hence, Sref should be decreased (Step 24).

$$F(0) > F(1) > F(2) \quad (6)$$

The Perch CH receive SIRs are used to calculate the number of connected BTSs in which the selection/synthesis gain can be obtained, and it is decided depending upon the number of BTSs whether or not the reference SIR should be changed. Thus, it is possible to change the reference SIR at a higher speed than that in the prior-art control method.

Alternatively, in the embodiment 2, a difference X between the maximum value Smax and the second largest value Sscd of Sp(i) may be calculated as in the first embodiment, and Sref may be defined as the above-mentioned function of Nbts and X. The relationship can be written in the following formula (7):

$$Sref = F(Nbts, X) \quad (7)$$

The constant α of the formula (3) discussed in the first embodiment may be varied according to Nbts. For example, the constant α may be more increased as Nbts becomes larger. In such a manner, by using both of Nbts and X as parameters of the function, it is possible to provide a more strict control in response to a variation in gain by the selection/synthesis.

Embodiment 3

Figure 8:
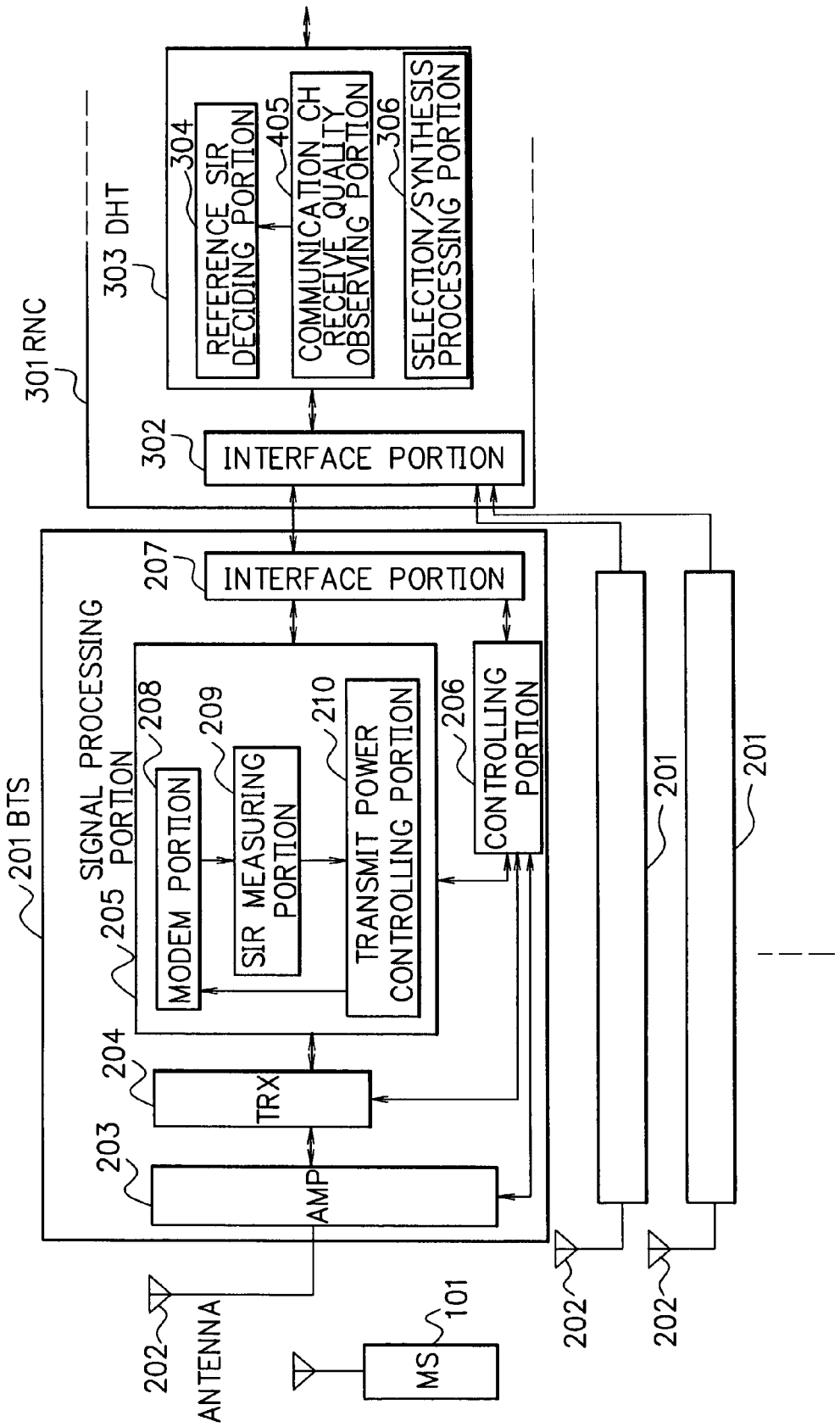
FIG. 8 is a block diagram of a CDMA mobile communication system to which the third and fourth embodiments are applied.
Figure 9:
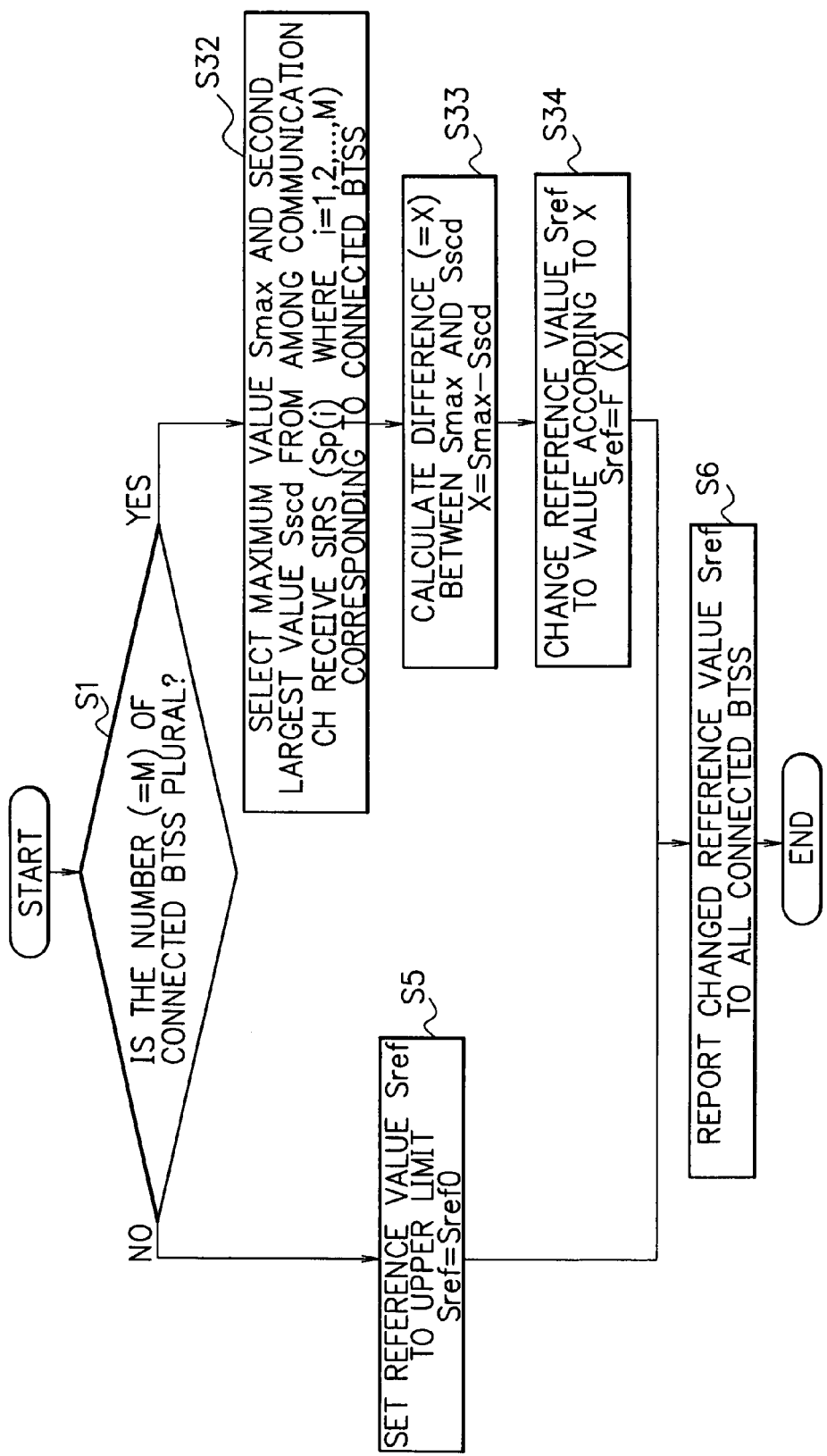
FIG. 9 is a flow chart showing an operation in the third embodiment.

A description will now be given of the embodiment 3 of the present invention referring to FIGS. 8 and 9. Referring to the block diagram of FIG. 8, the embodiment 3 differs from the embodiment 1 in that a communication CH receive quality observing portion 405 observes receive SIR information of an up communication CH, reported from a connected BTS 201, and depending upon the receive SIR information of the up communication CH, reported from the communication CH receive quality observing portion 405, it is decided in a reference SIR deciding portion 304 whether or not a reference SIR should be changed.

The reference SIR deciding portion 304 compares the sizes of the reported up communication CH receive SIRs corresponding to the connected BTSs to select the maximum SIR and the second largest SIR. If a difference between the maximum SIR and the second largest SIR is equal to a threshold value or less, the reference SIR is decreased according to the difference between the SIRs. If the difference between the maximum SIR and the second largest SIR is more than the threshold value or only one BTS is connected, the reference SIR is set to an upper limit. The reference SIR deciding portion 304 reports the changed reference SIR to the transmit power controlling portion 210 of the BTS 201.

Referring now to the flow chart of FIG. 9, a description will be given of a reference SIR deciding algorithm employed in the reference SIR deciding portion 304. The embodiment 3 differs from the embodiment 1 in that the maximum value Smax and the second largest value Sscd are selected from among up communication CH receive SIRs corresponding to the connected BTSs in Step S32. A gain of selection/synthesis obtained in the selection/synthesis processing portion 306 can be estimated by finding a difference X between the maximum value Smax and the second largest value Sscd among the communication CH receive SIRs (Step S33). Then, Sref is defined as a function of X as follows (Step 34):

$$Sref = F(X) \quad (8)$$

FIG. 5 shows an illustrative relationship of the function F(X). When X is more than a threshold value T1, it is decided that a small gain can be obtained by selection/synthesis, resulting in setting Sref to an upper limit Sref 0. When X is equal to the threshold value T1 or less, the reference SIR Sref is changed by using a function in which Sref becomes larger as X becomes larger as in the illustrative expression (3) (Step S34). According to the above steps, by using a result of measurement of the communication CH receive SIR, it is decided whether or not the reference SIR should be changed. It is thereby possible to change the reference SIR at a higher speed than that in the prior-art control method.

Embodiment 4

Figure 10:
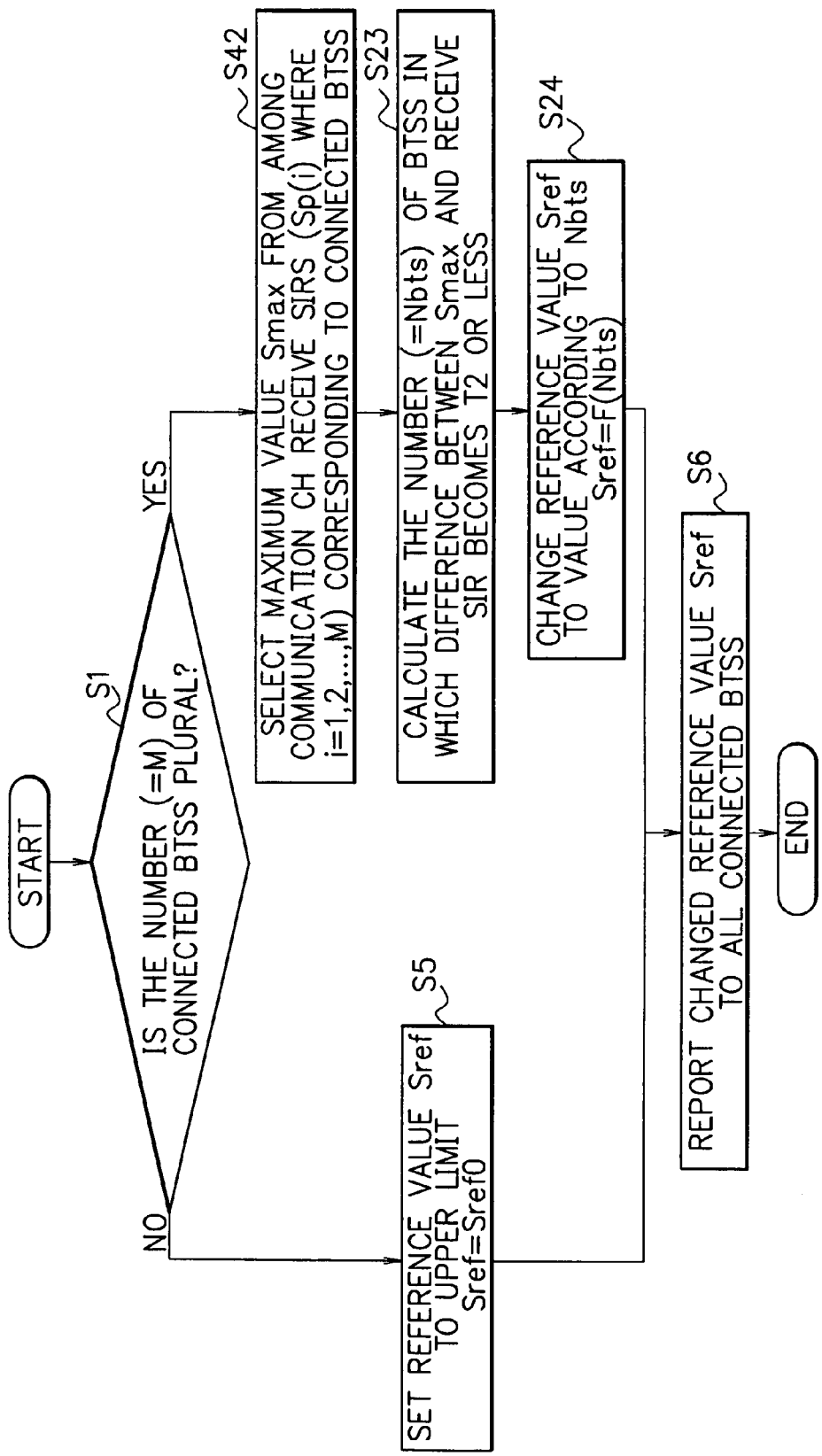
FIG. 10 is a flow chart showing an operation in the fourth embodiment.

A description will now be given of the embodiment 4 of the present invention referring to FIGS. 8 and 10. Referring to the block diagram of FIG. 8, the embodiment 4 differs from the embodiment 2 in that a communication CH receive quality observing portion 405 observes receive SIR information of an up communication CH, reported from a connected BTS 201, and based on the receive SIR information of the up communication CH, reported from the communication CH receive quality observing portion 405, it is decided in a reference SIR deciding portion 304 whether or not a reference SIR should be changed.

A reference SIR deciding portion 304 selects the maximum value from among up communication CH receive SIRs corresponding to connected BTSs, reported from a Perch CH receive quality observing portion 305, and calculates the number of connected BTSs (Nbts) in which a difference between the maximum value and the receive SIR becomes equal to a threshold value or less, thereby deciding depending upon Nbts whether or not the reference SIR should be changed. If Nbts is two or more, a current reference SIR is changed according to Nbts. If Nbts is one or only one BTS is connected, the reference SIR is set to an upper limit. The reference SIR deciding portion 304 reports the changed reference SIR to a transmit power controlling portion 210 of a BTS 201.

Referring now to the flow chart of FIG. 10, a description will be given of a reference SIR deciding algorithm employed in the reference SIR deciding portion 304. In the flow chart, i denotes the BTS connected to an MS 101, and M is the number of BTSs. If M is two or more (Step S1), the maximum value Smax is selected from among up communication CH receive SIRs corresponding to the connected BTSs (Step S42). Subsequently, a calculation is made to find the number Nbts of connected BTSs in which a difference between Smax and the up communication CH receive SIR except Smax becomes equal to a predetermined threshold value T2 or less (Step S23). As Nbts becomes larger, a selection/synthesis gain becomes larger. Hence, Sref is changed to decrease. FIG. 7 shows an illustrative relationship between Nbts and Sref. By using the receive SIR of the communication CH, a calculation is made to find the number of connected BTSs in which the selection/synthesis gain can be obtained, and it is decided whether or not the reference SIR should be changed. It is thereby possible to change the reference SIR at a higher speed than that in the prior art control method.

Alternatively, in the embodiment 4, there may be employed another method in which a difference X between the maximum value Smax and the second largest value Sscd of Sp(i) is calculated as in the third embodiment, and Sref is found by the above-mentioned function of Nbts and X according to the formula (7). In this method, the constant of the formula (3) discussed in the embodiment 3 may be varied according to Nbts. For example, the constant may be more increased as Nbts is larger. By using both of Nbts and X as parameters of the function, it is possible to provide a more strict control in response to a variation in gain by the selection/synthesis.

According to the above embodiments, by observing for each of the connected BTSs the receive SIR of the Perch CH received by the MS, it is possible to detect the variation in selection/synthesis gain in the RNC. It is thereby possible to change at a high speed the reference SIR used for reference in a high-speed closed loop control of an up link.

As is apparent from the above discussion, the transmit power control method in the CDMA mobile communication system of the present invention includes the step of checking whether one or more base transceiver stations (BTSs) are connected, the step of, when the result of the checking step shows that two or more BTSs are connected, selecting CH receive SIRs (Signal to Interference Ratios) corresponding to the connected BTSs, and making the calculation by using the selected values, and the step of changing the value of the reference value Sref according to the result of calculation. The method also includes the step of, when the result of the checking step shows that only one BTS is connected, setting the reference value Sref to the upper limit, and the step of reporting the changed reference value Sref to all the connected BTSs in each of the steps. Therefore, it is possible to change the reference SIR at a high speed in response to the variation in selection/synthesis gain due to the increase or the decrease of the number of connected BTSs.

While preferred embodiments of the present invention have been described using specific terms, such description is for illustrative purposes only, and it is to be understood that changes and variations may be made without departing from the spirit or scope of the following claims.

What is claimed is:

1. A transmit power control method in a Code Division Multiple Access (CDMA) mobile communication system during a selection/synthesis processing in a Radio Network Controller (RNC) of up receive signals from each of base transceiver stations (BTSs) connected thereto, said method comprising:
   a checking step of checking whether one or BTSs are connected to a specific mobile station;
   a calculating step of, when a result of the checking step shows that two or more BTSs are connected, using a predetermined selection criterion for selecting CH (channel) receive SIRs (Signal to Interference Ratios) corresponding to certain ones of the connected BTSs, and making a calculation by using values of the selected SIRs;
   a reference value changing step of changing a value of a reference value Sref according to a result of the calculation;
   an upper limit setting step of, when the result of the checking step shows that only one BTS is connected, setting the reference value Sref to an upper limit; and
   a reporting step of reporting the changed reference value Sref to all the connected BTSs,
   wherein the reference value Sref is decided in the RNC in response to a variation in a selection/synthesis gain due to an increase or a decrease of the number of connected BTSs.

2. A transmit power control method in a CDMA mobile communication system according to claim 1, wherein the CH receive SIR comprises one of a Perch CH receive SIR and a communication CH receive SIR for each of the connected BTSs.

3. The transmit power control method of claim 1, wherein said calculating comprises calculating a difference X between a maximum value Smax and a second largest value Sscd from among the CH receive SIRs, and said reference value Sref is calculated by a function of a number of connected BTSs (Nbts) and X.

4. The method of claim 1, wherein the decision for said reference value Sref includes an evaluation of a degree of contribution of each said connected BTS.

5. The method of claim 1, wherein the decision for said reference value Sref includes determining whether the selection/synthesis gain can be obtained by checking whether a difference of said SIRs received at said BTSs is small.

6. A transmit power control method in a Code Division Multiple Access (CDMA) mobile communication system during a selection/synthesis processing in a Radio Network Controller (RNC) of up receive signals from each of base transceiver stations (BTSs) connected thereto, said method comprising:
   a checking step of checking whether one or more BTSs are connected to a specific mobile station;
   a calculating step of, when a result of the checking step shows that two or more BTSs are connected, using a predetermined selection criterion for selecting CH (channel) receive SIRs (Signal to Interference Ratios)

corresponding to selected ones of the connected BTSs, and making a calculation by using values of the selected SIRs;

a reference value changing step of changing a value of a reference value Sref according to a result of the calculation;

an upper limit setting step of, when the result of the checking step shows that only one BTS is connected, setting the reference value Sref to an upper limit; and a reporting step of reporting the changed reference value Sref to all the connected BTSs, wherein the reference value Sref is decided in the RNC in response to a variation in selection/synthesis gain due to an increase or a decrease of the number of connected BTSs, wherein:

said CH receive SIR comprises one of a Perch CH receive SIR and a communication CH receive SIR for each of the connected BTSs, and said calculation made by using the selected value in the calculating step-comprises:

one of selecting a maximum value Smax and a second largest value Sscd from among the CH receive SIRs corresponding to the connected BTSs and selecting the maximum value Smax from among the CH receive SIRs corresponding to the connected BTSs; and one of calculating a difference (X) between the Smax and the Sscd and calculating a number (Nbts) of BTSs in which a difference between the Smax and the receive SIR becomes a predetermined value T2 or less.

7. A transmit power control method in a CDMA mobile communication system according to claim 6, wherein, when the difference X is equal to a predetermined threshold value T1 or more, it is decided that only a small gain can be obtained by selection/synthesis, thereby setting the reference value Sref to an upper limit irrespective of results of the steps.

8. A transmit power control method in a CDMA mobile communication system according to claim 6, wherein, when the difference X is equal to a predetermined threshold value T1 or less, it is decided that a sufficient gain can be obtained by selection/synthesis, thereby setting the reference value Sref to a value according to the difference X.

9. A transmit power control method in a CDMA mobile communication system according to claim 6, wherein the reference value Sref is found by the following expression:

$$Sref=Sref0-(T1-X)\times\alpha$$

where $\alpha$ is a desired constant,

T1 is a predetermined threshold value, and

Sref0 is an upper limit.

10. A transmit power control method in a Code Division Multiple Access (CDMA) mobile communication system during a selection/synthesis processing in a Radio Network Controller (RNC) of up receive signals from each of base transceiver stations (BTSs) connected thereto, said method comprising:

a checking step of checking whether one or more BTSs are connected to a specific mobile station;

a calculating step of, when a result of the checking step shows that two or more BTSs are connected, using a predetermined selection criterion for selecting CH (channel) receive SIRs (Signal to Interference Ratios) corresponding to selected ones of the connected BTSs, and making a calculation by using values of the selected SIRs;

a reference value changing step of changing a value of a reference value Sref according to a result of the calculation;

an upper limit setting step of, when the result of the checking step shows that only one BTS is connected, setting the reference value Sref to an upper limit; and a reporting step of reporting the changed reference value Sref to all the connected BTSs, wherein the reference value Sref is decided in the RNC in response to a variation in a selection/synthesis gain due to an increase or a decrease of the number of connected BTSs, wherein:

said CH receive SIR comprises one of a Perch CH receive SIR and a communication CH receive SIR for each of the connected BTSs, said calculation made by using the selected value in the calculating step comprises:

one of selecting a maximum value Smax and a second largest value Sscd from among the CH receive SIRs corresponding to the connected BTSs and selecting the maximum value Smax from among the CH receive SIRs corresponding to the connected BTSs; and one of calculating a difference (X) between the Smax and the Sscd and calculating a number (Nbts) of BTSs in which a difference between the Smax and the receive SIR becomes a predetermined value T2 or less, and said reference value changing step comprises one of changing the reference value Sref to a value according to the difference (X) and changing the reference value Sref to a value according to the number (Nbts).

11. A transmit power control method in a CDMA mobile communication system according to claim 10, wherein, when the difference X is equal to a predetermined threshold value T1 or more, it is decided that only a small gain can be obtained by selection/synthesis, thereby setting the reference value Sref to an upper limit irrespective of results of the steps.

12. A transmit power control method in a CDMA mobile communication system according to claim 10, wherein, when the difference X is equal to a predetermined threshold value T1 or less, it is decided that a sufficient gain can be obtained by selection/synthesis, thereby setting the reference value Sref to a value according to the difference X.

13. A transmit power control method in a CDMA mobile communication system according to claim 10, wherein the reference value Sref is found by the following expression:

$$Sref=Sref0-(T1-X)\times\alpha$$

where $\alpha$ is a desired constant,

T1 is a predetermined threshold value, and

Sref0 is an upper limit.

14. A transmit power control method in a Code Division Multiple Access (CDMA) mobile communication system, said method comprising, in a radio network controller (RNC) interconnected to a plurality of Base Transceiver Stations (BTSs):

selecting CH (channel) receive SIRs (Signal to Interference Ratios) corresponding to BTSs connected to a specific Mobile Station (MS), said selecting based on a selection criterion which defines which of the connected BTSs will be involved;

calculating a selection/synthesis gain from said selected SIRs;

using said selection/synthesis gain to calculate a reference value Sref for an outer loop control of said transmit power; and outputting a signal to be provided to a transmitter of said RNC for transmission of said reference value Sref to said interconnected BTSs.

15. The transmit power control method of claim 14, further comprising:

transmitting said reference value Sref to all BTSs connected to said MS.

16. The transmit power control method of claim 14, further comprising:

prior to said selecting CH receive SIRs, determining whether more than one BTS is connected to said MS.

17. The transmit power control method of claim 14, wherein said calculating said selection/synthesis gain comprises calculating a difference X between a maximum value Smax and a second largest value Sscd from among the CH receive SIRs, and said reference value Sref is calculated by:
determining whether said difference X exceeds a predetermined threshold.

18. The transmit power control method of claim 17, the calculation for said reference value Sref further comprising:
if said threshold is exceeded, setting Sref to an upper limit.

19. The transmit power control method of claim 18, the calculation for said reference value Sref further comprising:
if said threshold is not exceeded, changing Sref as a function of said difference X.

20. The transmit power control method of claim 14, wherein said calculating said selection/synthesis gain comprises determining a maximum value Smax and determining a number of connected BTSs (Nbts) for which a difference between said maximum value Smax and the receive SIR becomes equal to a predetermined threshold value or less, and said reference value Sref is calculated by:
if Nbts$\leq$1, setting Sref to an upper limit; and
if Nbts$\geq$2, changing Sref as a function of Nbts.

21. The transmit power control method of claim 14, wherein said calculating said selection/synthesis gain comprises calculating a difference X between a maximum value Smax and a second largest value Sscd from among the CH receive SIRs, and said reference value Sref is calculated by a function of a number of connected BTSs (Nbts) and X.

22. An apparatus serving as a radio network controller (RNC) in a Code Division Multiple Access (CDMA) mobile communication system, said apparatus comprising:

a Perch CH (channel) receive quality observing portion to receive SIRs (Signal to Interference Ratios) from all Base Transceiver Stations (BTSs) connected to a specific Mobile Station (MS); and a selection/synthesis processing portion to select ones of said SIRs to calculate a selection/synthesis gain, a predetermined selection criterion being used to define which SIRs of said connected BTSs are to be selected for calculating.

23. The apparatus of claim 22, wherein said selection/synthesis process portion further uses said selection/synthesis gain to calculate a reference value Sref for an outer loop control of a transmit power for said CDMA system.

* * * * *